US005530774A

United States Patent [19]
Fogel

[11] Patent Number: 5,530,774
[45] Date of Patent: Jun. 25, 1996

[54] GENERATION OF DEPTH IMAGE THROUGH INTERPOLATION AND EXTRAPOLATION OF INTERMEDIATE IMAGES DERIVED FROM STEREO IMAGE PAIR USING DISPARITY VECTOR FIELDS

[75] Inventor: Sergei V. Fogel, Rochester, N.Y.

[73] Assignee: Eastman Kodak Company, Rochester, N.Y.

[21] Appl. No.: 218,276

[22] Filed: Mar. 25, 1994

[51] Int. Cl.$^6$ ..................................................... G06K 9/00
[52] U.S. Cl. ........................... 382/154; 382/295; 348/50
[58] Field of Search ...................................... 382/1, 41, 44, 382/45, 154, 276, 293, 295; 348/42, 46, 50; 395/119, 127; 354/110, 112; H04N 13/00, 15/00

[56] References Cited

U.S. PATENT DOCUMENTS

| | | | |
|---|---|---|---|
| 4,552,853 | 11/1985 | Kawabata et al. | 501/134 |
| 4,661,986 | 4/1987 | Adelson | 382/41 |
| 4,674,853 | 6/1987 | Street | 354/112 |
| 4,724,449 | 2/1988 | Wright | 354/112 |
| 4,837,616 | 6/1989 | Kasano et al. | 358/107 |
| 4,956,705 | 9/1990 | Wright | 358/88 |
| 4,965,752 | 10/1990 | Keith | 364/522 |
| 5,259,037 | 11/1993 | Plunk | 382/1 |
| 5,325,472 | 6/1994 | Horiuchi et al. | 395/127 |
| 5,432,554 | 7/1995 | Nickerson et al. | 348/391 |
| 5,436,672 | 7/1995 | Medioni et al. | 348/591 |
| 5,438,654 | 8/1995 | Drebin et al. | 395/139 |
| 5,440,350 | 8/1995 | Golin | 348/699 |
| 5,455,682 | 10/1995 | Ikuta | 358/298 |

OTHER PUBLICATIONS

Webster's Ninth New Collegiate Dictionary, Merriam-Webster Inc., p. 600, 1990.

*Primary Examiner*—Leo Boudreau
*Assistant Examiner*—Andrew W. Johns
*Attorney, Agent, or Firm*—Gordon M. Stewart

[57] ABSTRACT

A depth image is generated from a pair of stereo images by means of a disparity vector field-based digital image processing methodology. Specifically, images corresponding to missing angular views are derived from the stereo image pair based upon an iteratively refined set of disparity vector fields that associate desired missing image locations with the pair of stereo images. For a reduced angular separation between the optically recorded pair of stereo images, the stereo images are employed as the images corresponding to intermediate angular viewing locations, and images corresponding to missing angular views are reconstructed by either digitally interpolating or digitally extrapolating the stereo image pair, depending on whether or not the missing angular view is between the angular views of the stereo image pair or outside the angular views of the stereo image pair. The missing images are then interlaced with the images of the stereo to derive the depth image. A system of nonlinear equations is formed relative to an unknown current estimate of the disparity vector field corresponding to the missing image. This system of nonlinear equations is then linearized from which initial estimates of the disparity vector fields are derived relative to the current estimates of the disparity vector fields. Solutions to the resulting set of linear equations are used to iteratively refine estimates of the disparity vector fields.

54 Claims, 6 Drawing Sheets

GENERATION OF DEPTH IMAGE THROUGH INTERPOLATION AND EXTRAPOLATION OF INTERMEDIATE IMAGES DERIVED FROM STEREO IMAGE PAIR USING DISPARITY VECTOR FIELDS

FIELD OF THE INVENTION

The present invention relates in general to digital image processing, and is particularly directed to a mechanism for constructing a single 'depth' image from a pair of stereo images by digitally extrapolating and/or digitally interpolating intermediate images derived from the stereo image pair, using disparity vector fields and interlacing the intermediate images into a single depth image.

BACKGROUND OF THE INVENTION

The production of images that convey the perception of depth to a human observer has traditionally been accomplished by analog photographic methods, such as integral and lenticular photography, which, while having a long history of theoretical consideration and demonstration, have enjoyed only limited commercial success. For examples of published material on the subject attention may be directed to a text by Takanori Okoshi, entitled "Three-Dimensional Imaging Techniques," Academic Press, New York, 1976; and an article by G. Lippman, entitled "E'preuves re'versibles, Photographics integrales," published in Comptes Rendus, pp. 146, 446–451, Mar. 2, 1908.

Integral photography refers to the composition of the overall image as an integration of a large number of microscopically small photographic image components. Each photographic image component is viewed through a separate small lens, usually formed as part of a mosaic of identical spherically-curved surfaces, that are embossed or otherwise formed onto the front surface of a sheet of translucent material (e.g. clear plastic) of appropriate thickness. This sheet is subsequently bonded or held in close contact with an emulsion layer containing the photographic image components.

Lenticular photography may be considered as a special case of integral photography, where the individual small lenses are formed as sections of cylinders running the full extent of the print area in the vertical direction. One recently commercialized attempt at a form of lenticular photography is the 'Nimslo' camera, manufactured by a Hong Kong camera works and sold as a Nishika camera. Although a sense of depth is clearly visible, the resulting printed images have only limited depth realism, and appear to 'jump' as the print image is 'rocked' or the viewer's vantage relative to the image print is changed.

An analog optical technique of producing lenticular photographs, described in the above-referenced Okoshi text, involves affixing a photographic camera to a carriage on a slide rail, which allows the camera to be translated in a horizontal direction normal to the direction of the desired scene. Then, as the camera carriage is translated along the slide rail, respective photographic images are captured in successively equal increments, from a central vantage point to lateral vantage points on either side of the central vantage point. The distance that the lateral vantage points are spatially displaced from the central vantage point is dependent on the maximum angle at which the lenticular material can project photographic image components contained behind any given lenticule before it begins to project photographic image components contained behind an adjacent lenticule.

Although not necessary, the number of captured images may include a picture from the central vantage point, in which case the number of captured images will be odd. (If a picture from the central vantage point is included, the number of images will be odd.) The sum of the total number of views contained between and including the lateral vantage points will determine the number of photographic components which eventually will be contained behind each lenticule.

Negatives resulting from each of these views are then placed in an image enlarger which is equipped with a lens of the same focal length as the camera lens. Since the camera was moved laterally between successive exposures, as previously described, the positions of the images in the original scene will be seen to translate laterally across the film format. Consequently, the positions of the enlarged images from the negatives also move laterally with respect to the center of the enlarger's easel, as successive negatives are placed in the film gate.

An assemblage, consisting of a sheet of photographic material oriented with its emulsion in contact with the flat back side of a clear plastic sheet of appropriate thickness having lenticules embossed or otherwise formed into its other side, is then placed on the enlarger easel with the lenticular side facing the enlarger lens. The position of this sheet on the easel is adjusted until the field of the central image is centered on the center of the assemblage, and an exposure of the information being projected out of the enlarger lens is made through the lenticules onto the photographic emulsion. Thereafter, negatives from the successive exposures are placed in the film gate and the position of the assemblage is readjusted on the easel, so as to reposition each respective view to the center of the assemblage, and additional exposures of the information being projected from the enlarger lens are made.

When all the views between the lateral vantages have been similarly exposed on the emulsion through the lenticular plastic sheet, the film sheet can be separated from the lenticular plastic sheet and developed. If the aperture diameter of the enlarger lens is set at a value corresponding to the amount of lateral shift between alternate views, then the space behind each lenticule will be found to be exactly filled with photographic image components.

The final step in this process is to reassemble the photographic film and the plastic sheet again with intimate contact between the emulsion layer and the flat side of the lenticular plastics sheet and positioned laterally, so that the long strips of adjacent images resulting from exposures through the cylindrical lenticules are again positioned in a similar manner under the lenticules for viewing.

Ideally, an integral or lenticular photograph should display an infinite number of different angular views from each lenslet or lenticule. From a practical standpoint, however, this is not possible since each angular view must have a corresponding small finite area of exposed emulsion or other hard copy media. As a consequence, as an upper limit, the number of views must not exceed the resolution limit of the hard copy media.

In a print obtained by the above-referenced 'Nimslo' camera, the number of views behind each lens is limited to four views, two of which are considered left perspective views and the remaining two are considered as right perspective views. This is well below the resolution limit of conventional photographic emulsions and allows for only two options of stereoscopic viewing perspective as the viewer's head moves laterally.

Optical multiple projection has also been utilized in experiments by Eastman Kodak to produce a print by means of a large number of cameras taking alternate views of the scene to provide a smooth transition of perspectives for each lens. This method of image recording is called 'indirect multiple optical projection and recording' since the final print recording is derived 'indirectly' from a series of two-dimensional image recordings.

The concept of integral photography by indirect optical recording is also described in the U.S. Patents to Wright, Nos. 4,724,449 (or the '449 patent) and 4,956,705 (or the '705 patent). The '449 Patent describes a photographic camera with a laterally shifting film holder essentially similar to the techniques described by Okoshi to capture a number of perspectives of a scene and recording image information onto different negatives for eventual processing into three-dimensional prints. Although the manner in which a viewable print is obtained from the negatives is not described, it may be inferred that image separation must be provided only in the horizontal direction, since only lateral camera motion is described. This suggests that either the lenticular means described above is used, or raster occlusion, such as using a Ronchi ruling on a faceplate spatially located in front of the composite print so as to prevent the images intended for viewing by the right eye to be seen by the left eye and vice versa, is the mode of print display. A technique of raster occlusion to produce a print has been described extensively in textbooks (see, for example, the texts by L Lipton, "Foundations of the Stereoscopic Camera," Van Nostrand Reinhold, New York, 1978; and by N. A. Valyus, "Stereoscopy," Focal Press, London, 1962) and suffers from the additional problem of reduced image brightness.

The above-referenced '705 Patent describes the same image capture process using video charge coupled device (CCD) array cameras, rather than photographic cameras, and further discusses capturing the images using a "frame grabber" board in a computer which "freezes a frame of a still or moving object and digitizes the image for further processing."

Prior to the development of 'direct' printing processes, such as described in the U.S. Pat. Nos. 4,552,853 and 4,674,853. techniques for optically recording scenes on lenticular print material, so that the angular presentations of the lenslets corresponded correctly with the angular orientations of the original scene, relied upon indirect printing process.

A 'direct' printing process involves recording images using correct angular correlation. According to this method, a converging bundle of optical rays from a very large aperture camera lens is directed onto a sheet of lenticular material to which photographic film has been affixed in the same manner employed in the projection method, described previously.

SUMMARY OF THE INVENTION

In accordance with the present invention, the above-described limitations of conventional depth image generation schemes discussed above are successfully overcome by the disparity vector field-based digital image processing methodology, through which a 'target' depth image having an optimally appealing perception of depth is generated by using only a single pair of stereo images. Within the target depth image, images corresponding to missing angular views (the missing images) are derived from the stereo pair based upon an iteratively refined set of disparity vector fields that associate desired missing image locations with the pair of stereo images. Where the angular separation between the optically recorded pair of stereo images is small, these two stereo images are employed as the images corresponding to intermediate angular view locations, and images corresponding to missing angular views are reconstructed by either digitally interpolating or digitally extrapolating the stereo image pair, depending on whether or not the missing angular view is between the angular views of the stereo image pair or outside the angular views of the stereo image pair.

For capturing a stereo image pair from which the remaining images of the desired depth image are to be derived, one or more imaging cameras may be employed. Where a single camera is employed to capture the respective images of the stereo pair, changes in the camera observation or viewing position between respective left and right viewing locations take place strictly in the horizontal direction or along the X-axis of a rectangular (XYZ) coordinate system, where the Y-axis corresponds to depth into the image, and the Z-axis corresponds to the vertical dimension, so that the image forming plane of each image of the stereo lies in the X-Z plane. In addition, the horizontal and vertical axes of each missing image (to be constructed) at missing image viewing or observation locations respectively coincide with the horizontal and the vertical axes of the viewed scene.

To reconstruct each missing image at a respective missing image observation points, first a prescribed correspondence between a respective missing image and the two images of the stereo pair is derived. This derived correspondence is used to estimate a missing image at an observation point through either an interpolation or an extrapolation process. The prescribed correspondence between the missing image and the images of the stereo pair establishes the apparent movement in the three images caused by differences in the position of the camera lens.

Correspondence between a respective 'missing'0 image, associated with a missing image observation point and the respective spatially separated 'left' and 'right' stereo image observation points at which the pair of imaging stereo image pair of the scene have been captured by an image capture device (camera) can be characterized by a respective intermediate 'disparity vector field' (or optical flow), having a constant vertical component representative of the alignment of the images, and a variable horizontal component representative of the depths of the corresponding points in the scene. In a disparity vector field, depth is inversely proportional to the magnitude of the optical flow vector, so that the zero parallax plane occurs in that object space where the optical flow vectors have zero magnitude.

In order to digitally process the captured stereo pair, the stereo pair is initially digitized to a prescribed spatial and digital code resolution, whereby the resultant images may be applied to an attendant workstation. Where the stereo images are captured on a conventional film strip, they may be digitized by scanning the film strip with a digitizing film scanner, that is operative to output each left and right image of the stereo pair as a digitized image, comprised of a matrix of pixels having a prescribed spatial resolution, with each pixel being encoded to a given digital resolution.

The stereo images captured at respective left and right viewpoints are digitized into multi-banded digital images with a fixed number of bands. The band of each of the left and the right digital images may be expressed as a two-dimensional array or grid of pixels, arrayed in the X-Z plane and having associated pixel values which represent prescribed image parameters taken from a two-dimensional grid or array of points "$\Omega$" distributed throughout the observed and captured image.

Given the left digital image of the stereo image pair and taken at the 'left' stereo viewpoint and consisting of a plurality of bands, and given the right digital image taken at the 'right' stereo viewpoint and consisting of the plurality of bands, the process of constructing the depth image consisting of bands in accordance with the present invention next proceeds to estimate a plurality of disparity vector fields. (At the beginning of the process, there is no image history upon which to build; as a consequence, a 'coarsest' spatial resolution level disparity vector field estimate of a respective missing image is initially set to a preselected a constant. Each disparity vector field is then iteratively improved until final estimates of the disparity vector fields are obtained.)

A first step in the iterative improvement process is to compute values of filtered image band and values of partial derivatives of the filtered image band for each image band, and for each one of a plurality of filters. Each band of the left and the right images are filtered with filters, and with the spatial partial derivatives of these filters. A symbol G may be employed for the set of indices, with each index $g \epsilon G$ specifying a particular band and a particular filter.

The multi-level spatial resolution image processing mechanism in accordance with the present invention is built around a multi-level spatial resolution pyramid, wherein, at each increasingly finer resolution level, 'filtered-left' and 'filtered-right' images, their spatial partial derivatives, and estimates of disparity vector fields corresponding to the missing images are defined on subgrids of digital image points (pixels) at increasingly finer degrees of spatial resolution.

At a given spatial resolution level, the disparity vector fields associated with the missing images are defined on a matrix or grid of points $\Omega$ on an image plane having a size of N rows by M columns of pixels. Partial spatial derivatives are then taken with respect to the vertical and horizontal directions. The bands of the filtered left images, the spatial partial derivatives of the bands of the filtered left images, the bands of the filtered right images, and the spatial partial derivatives of the bands of the filtered right images are defined on the same grid of points $\Omega'$ on an image plane having a size of N' rows by M' columns of pixels.

The disparity vector fields corresponding to the missing images at a respective spatial resolution level are defined by a system of non-linear equations expressed in terms of the respective vertical and horizontal direction partial derivative variables. For this purpose, for each index $g \epsilon G$ specifying a prescribed filter and a particular image band, spatial partial derivatives of an optical flow function are formed with respect to the horizontal and vertical components of the current estimate of the disparity vector, corresponding to an index g as defined on the grid $\Omega$ sum, scaled on the one hand by a differential ratio factor of the spatial partial derivative of the estimated right filtered image band, and scaled on the other hand by a differential ratio factor of the spatial partial derivative of the estimated left filtered image band.

An optical flow function is defined, relative to the matrix of viewpoint locations $\Omega$, as the difference between the estimated right filtered image band and the estimated left filtered image band. In order to derive the estimated 'right' filtered image band, a grid of image points, which are taken from a right viewpoint, is located and perspective projections onto the horizontal vertical image capture plane are estimated. The perspective projections onto the image plane from a respective viewpoint are the grid points $\Omega$. The right filtered image is then interpolated from the grid of points $\Omega'$, where the right filtered image is defined to a grid of rightward image points. In a similar manner, the estimated 'left' filtered image band is determined on the basis of the viewpoint estimated perspective projections.

Respective right and left arrays of image points are obtained by shifting each image point of the grid $\Omega$ by an amount equal to scaling factors of the estimated disparity vector defined at that grid point. Each non-boundary grid point of the rectangular grid $\Omega$ is surrounded by eight nearest neighbors, specifying eight different directions on the image plane. For each boundary grid point of the rectangular grid $\Omega$, the nearest neighbors are present only for some of these eight different directions.

For each vector s from a set S specifying a particular direction on the image plane, a directional smoothness function (s, $\nabla u$) is formed, for the variable horizontal component u of the current estimate of the disparity vector field, corresponding to the missing image as a finite difference approximation to the directional derivative of the horizontal component u of the estimate of the disparity vector field corresponding to the missing image, where s denotes a vector on the image plane specifying one of the eight different directions on the image plane, and S denotes the set of these eight vectors.

The directional smoothness function (s,$\nabla u$) is defined on a rectangular subgrid of the rectangular grid $\Omega$, with the property that every grid point of the rectangular subgrid has a nearest neighbor (in the direction s) on the rectangular grid $\Omega$. At each grid point of the rectangular subgrid, the directional smoothness function (s, $\nabla u$) is equal to the difference between the value of the horizontal component u of the current estimate of the disparity vector field corresponding to the missing image at the nearest in the direction s neighbor of this grid point and the value of the horizontal component u of the current estimate of the disparity vector field corresponding to the missing image at this grid point.

A system of nonlinear equations relative to the unknown current estimate of the disparity vector field corresponding to the missing image is formed by combining the optical flow function and its associated spatial partial derivatives for each filter and each image band specified by the index $g \epsilon G$, together with the directional smoothness function (s, $\nabla u$) for each image direction $s \epsilon S$, and together with constant parameters using elementary algebraic operations.

Once the system of nonlinear equations from which initial estimates of the disparity vector fields are derived has been formed, these estimates are used as the current estimates of the disparity vector fields. The current system of nonlinear equations is then linearized relative to the current estimates of the disparity vector fields. The system of linear equations is then solved, and the resulting solution is employed to improve upon or refine the current estimates of the disparity vector fields.

After the current estimates of the disparity vector fields have been refined and improved upon to a desired degree of spatial resolution and error, proceeds to estimate the missing images at the finest spatial resolution viewpoints. For each respective image band, an estimate of the missing digital image band is derived as the sum of the estimated left digital image band, scaled by a prescribed spatial ratio factor and the estimated right digital image band, scaled by the spatial ratio factor. Then, using the grid of left image points, the left digital image band is interpolated from the grid $\Omega''$, where the left digital image is defined relative to the left grid. Likewise, the right digital image band is interpolated from the grid of points $\Omega''$ where the right digital image is defined to the right grid of image points.

Once all of the 'missing' images have been generated, via interpolation or extrapolation, the depth image is obtained by interlacing the missing images, with the stereo image pair. This interlacing of missing images on the basis of the relative locations of the missing image viewpoints and the locations at which the stereo pair have been derived establishes the apparent movement in the three images caused by differences in the position of the camera lens. By considering the change in position of the camera lens as a vector (optical flow), missing images have been estimated as though the camera has actually positioned at each of the missing image viewpoints.

DETAILED DESCRIPTION OF THE INVENTION

Figure 1:
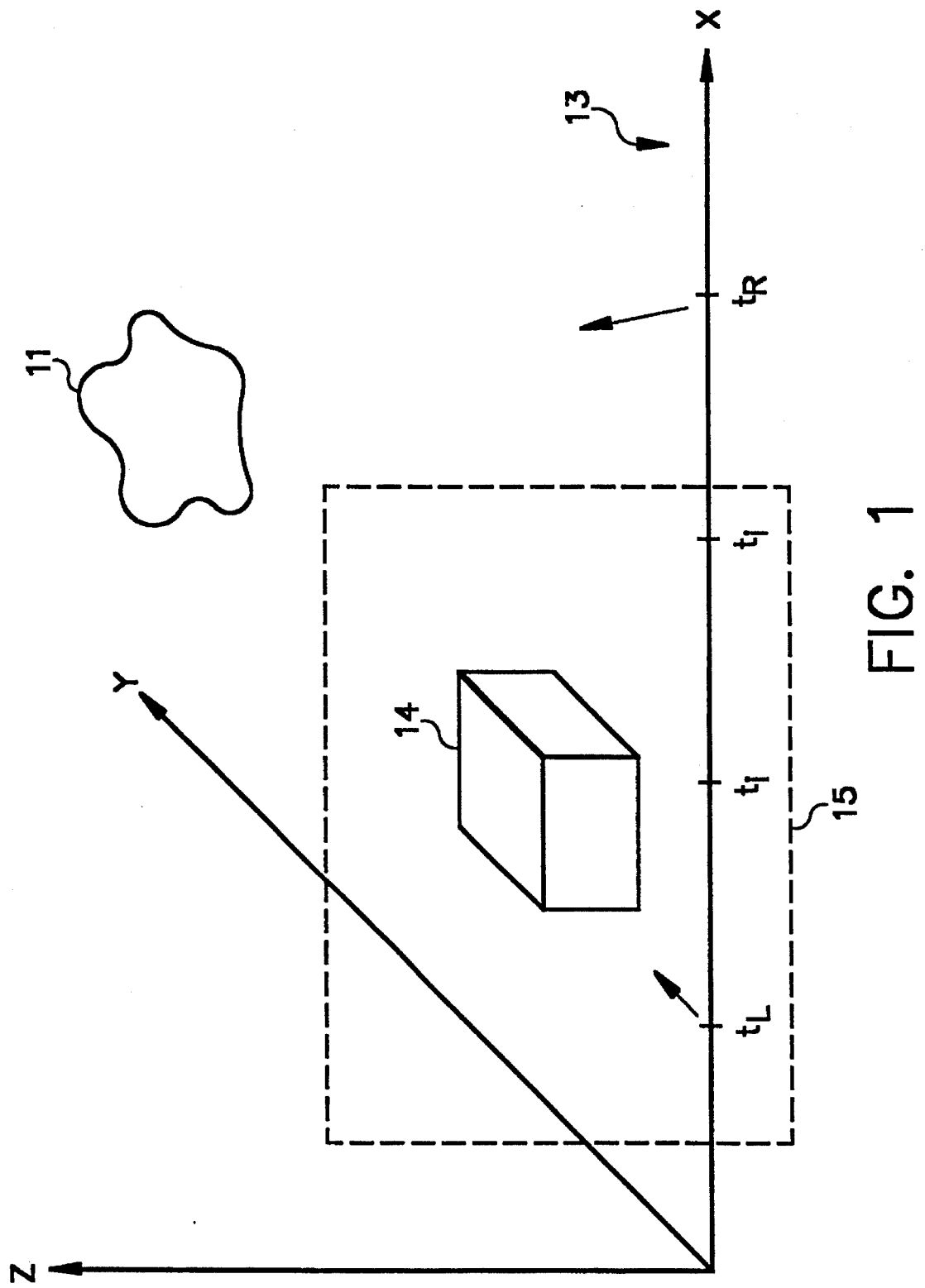
FIG. 1 diagrammatically illustrates a scene observation rectangular coordinate system, associated with the generation of a depth image, in accordance with respective steps of the present invention.

Before describing in detail the new and improved depth image generation mechanism in accordance with the present invention, it should be observed that the present invention resides primarily in what is effectively a prescribed digital image processing technique embedded within image processing application software executable by the control processor of a digital image processing workstation, through which images of a scene that have been derived from a plurality (pair) of scene viewing positions capable of providing depth information are processed. The sources of such images may be conventional stereo imaging hardware and are not considered part of the invention.

Consequently, the manner in which such image sources are interfaced with the workstation and the components of the workstation itself have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

As pointed out above, on the one hand, in order produce a depth image that imparts (to the viewer) the most appealing perception of depth, the number of angular views from which the resultant depth image is derived should be maximized. On the other hand, from an implementation standpoint, it is desirable to reduce the number of images that are actually optically recorded to only a single pair of stereo images, taken at two prescribed angularly separated spatial viewing locations and then, using this single stereo pair, reconstruct additional images that are to correspond to (missing) images that would otherwise have been recorded for the remaining angular views.

In the important practical case, where the angular separation between the images of the optically recorded stereo pair is relatively small (as might result from a single film strip camera having multiple lenses placed as close together as the image format would allow) these two stereo images are employed as the images corresponding to an 'intermediate' angular view, and images corresponding to 'missing' angular views are reconstructed by either digitally interpolating or digitally extrapolating the stereo image pair, depending on whether or not the missing angular view is between the angular views of the stereo image pair or outside the angular views of the stereo image pair.

Referring now to FIG. 1, the axes of a scene viewing or observation rectangular coordinate system, associated with the generation of a depth image in accordance with respective steps of the present invention, are diagrammatically illustrated as comprising a horizontal or X-axis, a vertical or Z-axis, and a depth or Y-axis. In accordance with a set of a priori conditions under which respective images of a scene 11 of interest are generated, the selection of a sequence of viewpoints $t_i$ of the viewed scene 11 is restricted in such a way that corresponding image planes associated with respective ones of a plurality of viewpoints $t_i$ coincide with the plane of the scene spanning the horizontal and vertical axes X and Z, respectively, as shown at 13.

For capturing a stereo image pair from which the remaining images of the desired depth image are to be derived, one or more imaging cameras, an individual one of which is diagrammatically illustrated at 14, have their image forming planes, shown at 15, positioned in the X-Z plane 13, and located at respective left and right viewing locations $t_L$ and $t_R$. Where a single camera is employed to capture the respective images of the stereo pair, changes in the camera observation or viewing position between the left and right viewing locations $t_i$ and $t_R$ take place strictly in the horizontal direction or along the X-axis of the coordinate system of FIG. 1, so that the image forming plane of each image of the stereo lies in the X-Z plane. In addition, the horizontal and vertical axes of each missing image (to be constructed) at missing image viewing or observation locations $t_i$ coincide, respectively, with the horizontal and the vertical axes of the viewed scene 11.

Pursuant to the present invention, in order to reconstruct each missing image at the respective missing image observation points $t_i$, first a prescribed correspondence between a respective missing image and the two images of the stereo pair is derived. As noted earlier, this derived correspondence is used to estimate the missing image at observation point ti through either an interpolation or an extrapolation process. The prescribed correspondence between the missing image and the images of the stereo pair establishes the apparent movement in the three images caused by differences in the position of the camera lens. By considering the change in position of the camera lens as a vector (optical flow), it is possible to estimate the missing images as though the camera were actually positioned at the missing image viewpoints, themselves. It should be noted that not all of the image points will have corresponding points of the stereo image pair, primarily due to occlusions, and allowances must be made to reconstruct images with these occurrences.

As pointed out briefly above, correspondence between a respective 'missing' image, associated with a missing image observation point $t_i$, and the respective spatially separated 'left' and 'right' stereo image observation points $t_L$ and $t_R$, at which the pair of imaging stereo image pair of the scene have been captured by camera 14, can be characterized by a respective intermediate 'disparity vector field' having a constant vertical component representative of the alignment of the images, and a variable horizontal component representative of the depths of the corresponding points in the scene. A 'disparity vector field' is commonly referred to in image analysis technology as 'optical flow' as described, for example, in the text entitled "Robot Vision," by B. K. P. Horn, The MIT Press, published 1991. One well-known aspect of optical flow is that depth is inversely proportional to the magnitude of the optical flow vector. In this instance, the zero parallax plane occurs in that object space where the optical flow vectors have zero magnitude, i.e., at points unaffected by change of camera position, such as background.

Figure 2:
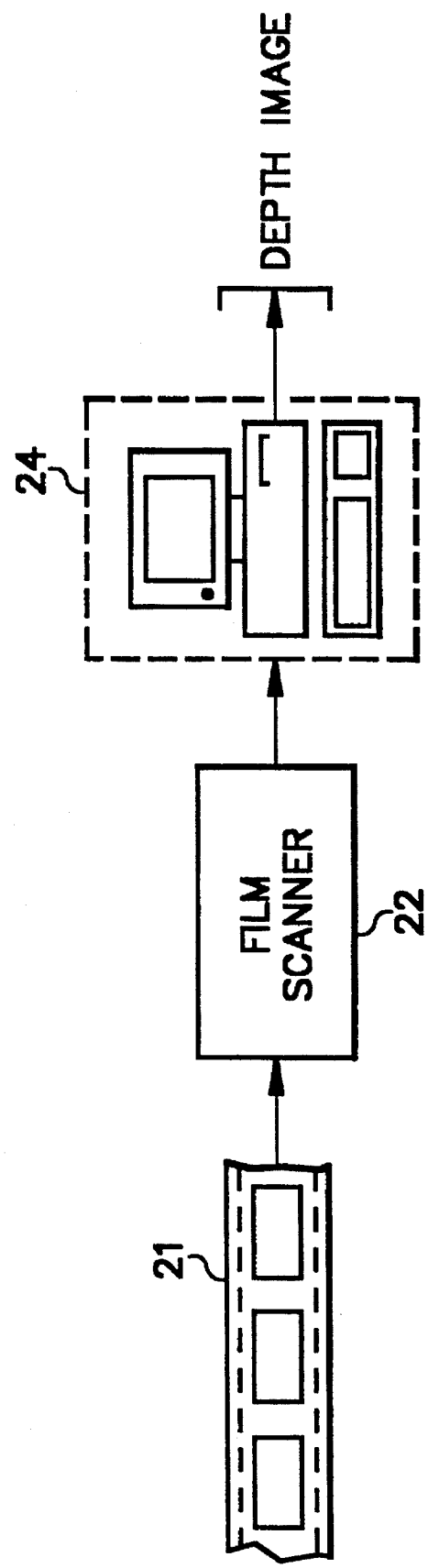
FIG. 2 diagrammatically illustrates an image processing system in which a captured stereo image pair is digitized and processing by way of a digital image processing workstation.

In order to digitally process the captured stereo pair in accordance with the image processing steps of the present invention, it is initially necessary to digitize the stereo pair to a prescribed spatial and digital code resolution, whereby the resultant images may be applied to an attendant workstation. For this purpose, as diagrammatically illustrated in FIG. 2, where images captured by camera 14 are contained on a conventional film strip 21, such as within 36 mm-by-24 mm image frames of a 35 mm film strip, they may be digitized by scanning the film strip with a digitizing film scanner, shown at 22. Scanner 22 may comprise a commercially available Eikonix Model 1435 scanner, which is operative to scan the respective frames of film strip 21 and output each left and right image of the stereo pair as a digitized image, comprised of a matrix of pixels having a prescribed spatial resolution, with each pixel being encoded to a given digital resolution (e.g. eight bits per color (twenty-four bits), per pixel). As a non-limitative example, spatial data values representative of a high spatial resolution (3072 columns ×2048 rows of pixels) image scan of a 36 mm-by-24 mm image frame of a 35 mm film strip may be produced by scanner 22 as a respective image data file for application to a digital image processing workstation 24. Workstation 24 is programmed to execute the image processing mechanism of the present invention to be described with reference to FIGS. 3 and 4.

Figure 3A:
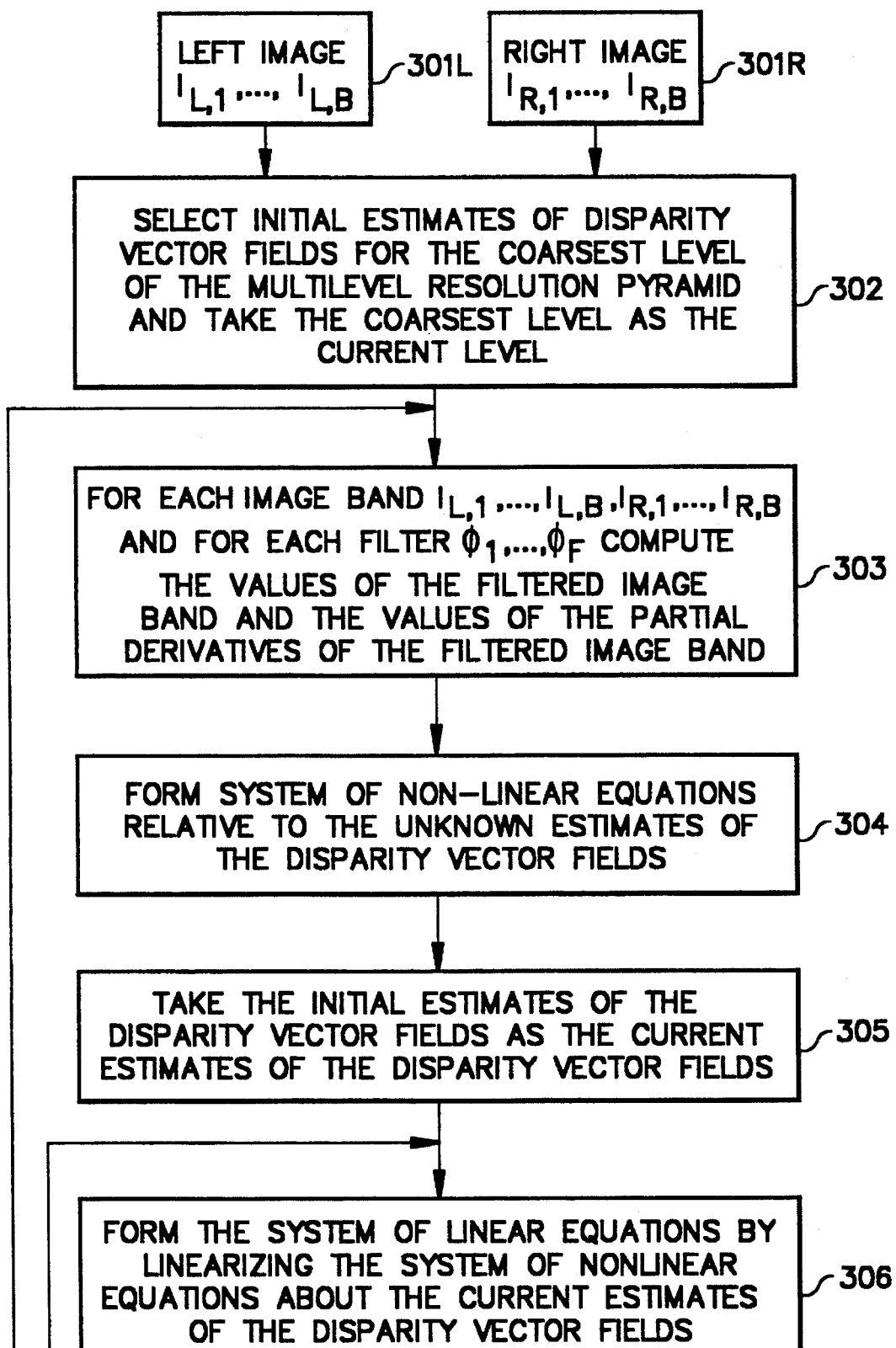
FIGS. 3A and 3B diagrammatically illustrate a top layer image processing flow diagram of the steps of the disparity vector-based depth image processing mechanism in accordance with the present invention, for a sequence of viewpoints $t_1, \ldots, t_L, \ldots, t_R, \ldots, t_K$ in the X-Z (viewing) plane of the image observation coordinate system of FIG. 1, respective left and right images of the scene having been captured at viewpoints $t_L$ and $t_R$, respectively, to provide a stereo image pair.
Figure 3B:
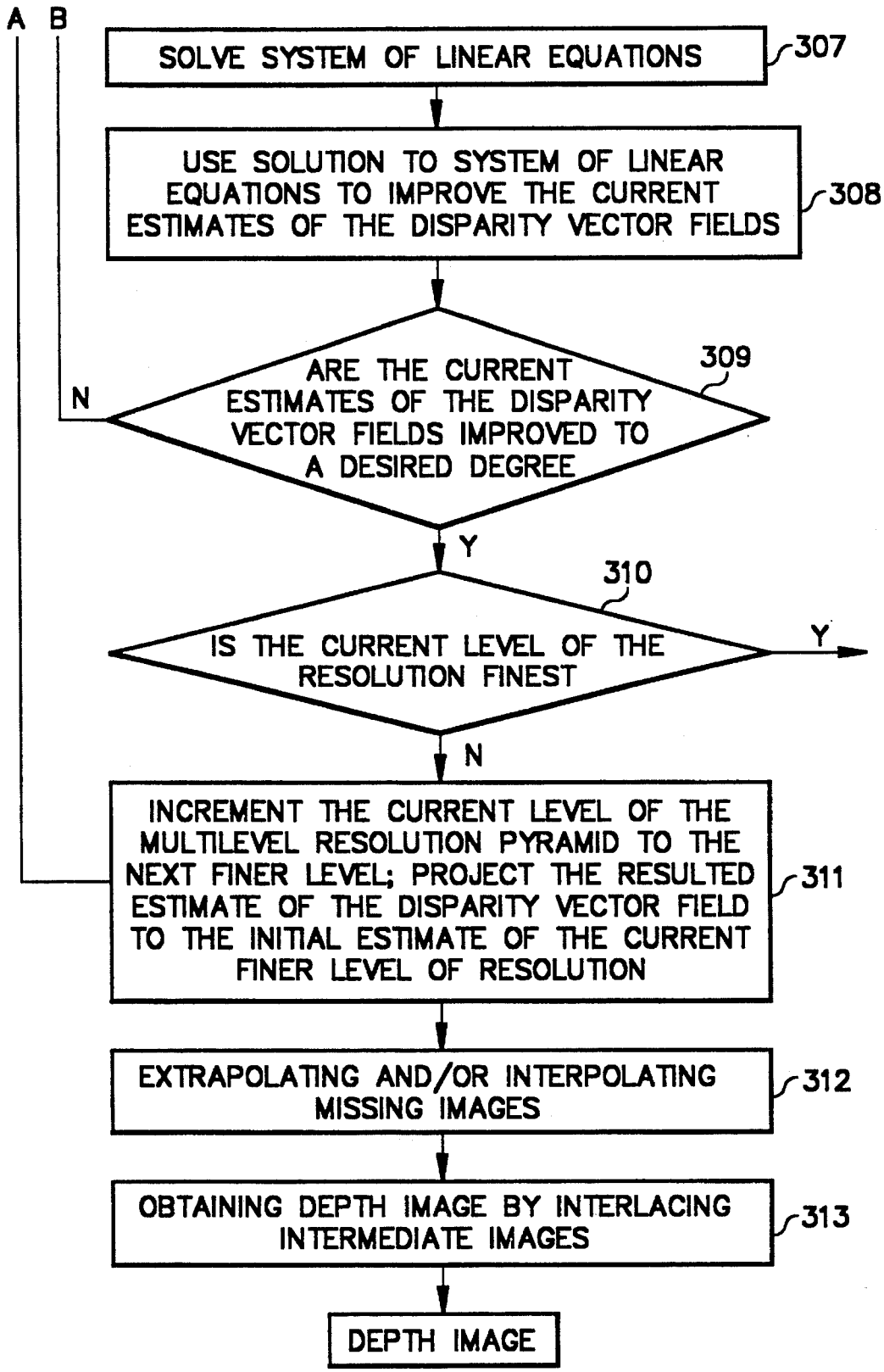

More particularly, FIG. 3 diagrammatically illustrates a top layer image processing flow diagram of the steps of the disparity vector-based depth image processing mechanism in accordance with the present invention, for a sequence of viewpoints $t_1 \ldots, t_L, \ldots, t_R, \ldots, t_K$ in the X-Z (viewing) plane of the image observation coordinate system of FIG. 1, respective left and right images of the scene having been captured by a camera 14, that has been positioned at viewpoints $t_L$ and $t_R$, respectively, to provide a stereo image pair.

As described above, each image of the stereo pair is digitized into a prescribed digital format for application to workstation 24, wherein the depth image reconstruction mechanism of the present invention is executed. For this purpose, as shown at steps 301L and 301R, the stereo images captured at the respective left and right viewpoints $t_L$ and $t_R$ are digitized into multi-banded digital images $DI_L$ and $DI_R$ with a fixed number of bands. Thus, the band of each of the left and the right digital images $DI_L$ and $DI_R$ may be expressed as a two-dimensional array or grid of pixels, arrayed in the X-Z plane of FIG. 1, and having associated pixel values which represent prescribed image parameters taken from a grid of points "$\Omega$" distributed throughout the observed and captured image. In accordance with a preferred embodiment of the invention, the grid is a 'rectangular' matrix or lattice of columns and rows of pixels, as diagrammatically illustrated for the image plane 15 of FIG. 1.

Given the left digital image $DI_L$ of the stereo image pair $DI_L$ and $DI_R$ taken at the 'left' stereo viewpoint $t_L$ and consisting of the bands $I_{L,1}, \ldots, I_{L,B}$, and given the right digital image $DI_R$ taken at the 'right' stereo viewpoint $t_R$ and consisting of the bands $I_{R,1}, \ldots, I_{R,B}$, the process of constructing the depth image consisting of the bands $D_1, \ldots, D_B$ in accordance with the present invention next proceeds to estimate a plurality of disparity vector fields $(U_k, V_k)$, where k=1, 2, ..., L–1, L+1, ..., R–1, R+1, ..., K. Namely, a set of disparity vector fields $(U_1, V_1), \ldots, (U_{L-1}, V_{L-1}), (U_{L+1}, V_{L+1}), \ldots, (U_{R-1}, V_{R-1}), (U_{R+1}, V_{R+1}), \ldots, (U_K, V_K)$ are estimated for the missing images at respective viewpoints $t_1, \ldots, t_{L-1}, t_{L+1}, \ldots, t_{R-1}, t_{R+1}, \ldots, t_K$.

As shown at step 302, since, at the beginning of the process, there is no image history upon which to build, a 'coarsest' spatial resolution level disparity vector field estimate of a respective missing image is initially set to some preselected value (e.g. a constant). Each disparity vector field is then iteratively improved until final estimates of the disparity vector fields are obtained.

A first step in the iterative improvement process, shown at step 303, comprises computing values of filtered image band and values of partial derivatives of the filtered image band for each image band $I_{L,1}, \ldots, I_{L,B}, I_{R,1}, \ldots, I_{R,B}$ and for each one of a plurality of filters $\phi_1, \ldots, \phi_F$. Each band of the left and the right images are filtered with filters $\phi_1, \ldots, \phi_F$ and with the spatial partial derivatives of these filters. A symbol G is used for the set of indices, with each index g∈G specifying a particular band and a particular filter.

As pointed out above, the multi-level spatial resolution image processing mechanism in accordance with the present invention is built around a multi-level spatial resolution pyramid, wherein, at each increasingly finer resolution level, 'filtered-left' and 'filtered-right' images, their spatial partial derivatives and estimates of disparity vector fields corresponding to the missing images are defined on subgrids of grids of digital image points (pixels) at increasingly finer degrees of spatial resolution. At a given spatial resolution level, the disparity vector fields associated with the missing images are defined on a grid or matrix of points $\Omega$ on an image plane having a size of N rows by M columns of pixels. In the description below, partial spatial derivatives taken with respect to the vertical direction are denoted by the subscript v, and partial spatial derivatives with respect to the horizontal direction are denoted by the subscript u. The bands of the filtered left images, the spatial partial derivatives of the bands of the filtered left images, the bands of the filtered right images, and the spatial partial derivatives of the bands of the filtered right images are defined on the same grid of points $\Omega'$ on an image plane having a size of N' rows by M' columns of pixels.

As shown at step 304, the disparity vector fields corresponding to the missing images at a respective spatial resolution level are defined by a system of nonlinear equations expressed in terms of the respective vertical and horizontal direction partial derivative variables (u,v), defined above.

Figure 4:
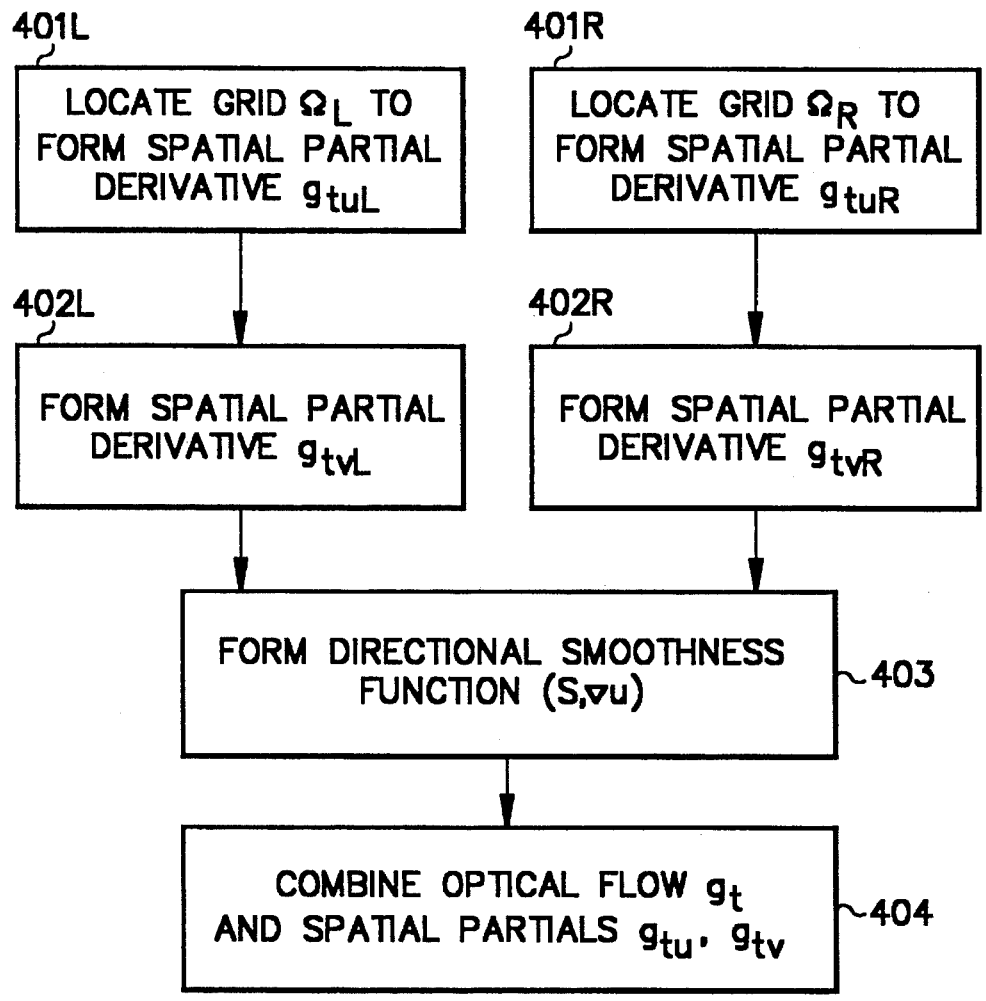
FIG. 4 shows a non-linear equation sub-routine flow diagram.

For this purpose, in the non-linear equation sub-routine in FIG. 4, for each index g∈G specifying a prescribed filter and a particular image band, spatial partial derivatives $g_{tu}$ and $g_{tv}$ of an optical flow function $g_t$ are formed with respect to the components u and v of the current estimate of the disparity vector, corresponding to the index g as defined on the grid $\Omega$ sum, scaled on the one hand by the factor $(t_R-t_k)/(t_R-t_L)$ spatial partial derivative of the estimated right filtered image band, and scaled on the other hand by the factor $(t_L-t_k)/(t_L-t_R)$ of the spatial partial derivative of the estimated left filtered image band.

The optical flow function $g_t$ is defined, relative to grid $\Omega$, as the difference between the estimated right filtered image band and the estimated left filtered image band. In order to derive the estimated 'right' filtered image band, it is necessary to locate a grid of image points $\Omega_R$, which are taken from the viewpoint $t_R$, and estimate perspective projections onto the XZ image plane of the visible points in the scene 11, whose perspective projections onto the image plane from the viewpoint $t_k$ are the grid points $\Omega$. The right filtered image is interpolated from the grid of points $\Omega'$, where the right filtered image is defined to the grid of image points $\Omega_R$. In a similar manner, a left set of image points $\Omega_L$ is located, so that the estimated 'left' filtered image band is determined on the basis of its viewpoint estimated perspective projections.

The grid or array of image points $\Omega_R$ is formed by shifting each image point of the grid $\Omega$ by an amount equal to a scaling factor value $(t_R-t_k)/(t_R-t_L)$ of the estimated disparity vector defined at that grid point. Similarly, the grid of image points $\Omega_L$ is obtained by shifting each image point of the grid $\Omega$ by the amount equal to a scaling factor value $(t_L-t_k)/(t_R-t_L)$ of the estimated disparity vector defined at that grid point.

More particularly, as shown in the flow diagram of FIG. 4, for the horizontal direction derivative variable (u), as shown at step 401R, a spatial partial derivative $g_{tuR}$ associated with the estimated right filtered image band is formed by locating the grid of image points $\Omega_R$, which are the taken from the viewpoint $t_R$, and perspective projections onto the image plane of the visible points in the scene, whose perspective projections onto the image plane from the viewpoint $t_k$ are the grid points $\Omega$, are estimated. The spatial partial derivatives of the right filtered image are then interpolated from the grid of points $\Omega'$ where the spatial partial derivative of the right filtered image is defined to the grid of points $\Omega_R$.

Likewise, as shown at step 401L, a spatial partial derivative $g_{tuL}$ associated with the estimated left filtered image band is derived by locating the grid of image points $\Omega_L$, which are the taken from the viewpoint $t_L$, and perspective projections onto the image plane of the visible points in the scene, whose perspective projections onto the image plane from the viewpoint $t_k$ are the grid points $\Omega$, are estimated. The spatial partial derivatives of the right filtered image are then interpolated from the grid of points $\Omega'$, where the spatial partial derivative of the left filtered image is defined to the grid of points $\Omega_L$.

For the vertical direction derivative variable (v), as shown at step 402R, a spatial partial derivative $g_{tvR}$ associated with the estimated right filtered image band is formed by locating the grid of image points $\Omega_R$, which are the taken from the viewpoint $t_R$, and perspective projections onto the image plane of the visible points in the scene, whose perspective projections onto the image plane from the viewpoint $t_k$ are the grid points $\Omega$, are estimated. The spatial partial derivatives of the right filtered image are then interpolated from the grid of points $\Omega'$ where the spatial partial derivative of the right filtered image is defined to the grid of points $\Omega_R$.

Likewise, as shown at step 402L, a spatial partial derivative $g_{vuL}$ associated with the estimated left filtered image band is derived by locating the grid of image points $\Omega_L$, which are the taken from the viewpoint $t_L$, and perspective projections onto the image plane of the visible points in the scene, whose perspective projections onto the image plane from the viewpoint $t_k$ are the grid points $\Omega$, are estimated. The spatial partial derivatives of the left filtered image are then interpolated from the grid of points $\Omega'$, where the spatial partial derivative of the left filtered image is defined to the grid of points $\Omega_L$.

Figure 5:
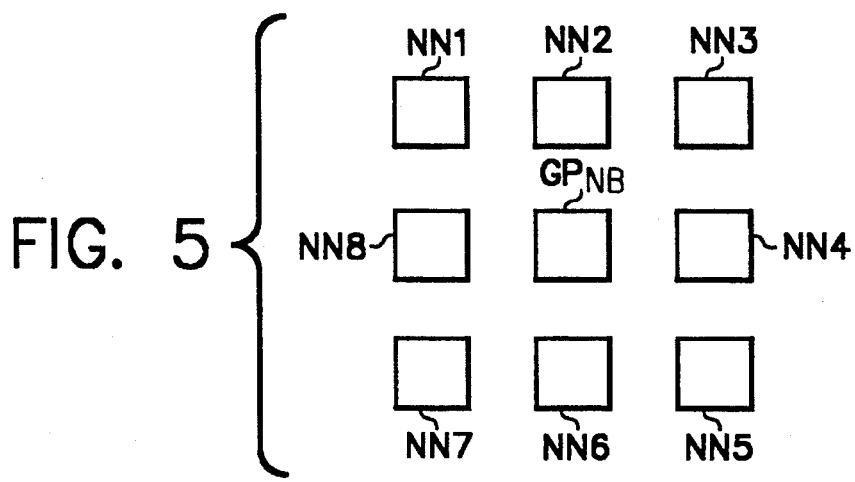
FIG. 5 diagrammatically illustrates a non-boundary grid point $GP_{NB}$ of a rectangular grid $\Omega$ is surrounded by eight nearest neighbors NN1–NN8 specifying eight different directions on the image plane.

As diagrammatically illustrated in FIG. 5, each non-boundary grid point $GP_{NB}$ of the rectangular grid $\Omega$ is surrounded by its eight nearest neighbors NN1–NN8 specifying eight different directions on the image plane. For each boundary grid point $GP_B$ of the rectangular grid $\Omega$, the nearest neighbors are present only for some of these eight different directions.

Letting the symbol s denote a vector on the XZ image plane specifying one of these eight different directions on the image plane, and the symbol S denote the set of these eight vectors, then for each vector s from the set S specifying a particular direction on the image plane, a directional smoothness function $(s, \nabla u)$ is formed, as shown at step 403, for the variable horizontal component u of the current estimate of the disparity vector field, corresponding to the missing image as a finite difference approximation to the directional derivative of the horizontal component u of the current estimate of the disparity vector field corresponding to the missing image.

In executing step 403, the directional smoothness function $(s, \nabla u)$ is defined on a rectangular subgrid $\Omega_s$, of the rectangular grid $\Omega$, with the property that every grid point of the rectangular subgrid $\Omega_s$ has a nearest neighbor (in the direction s) on the rectangular grid $\Omega$. At each grid point of the rectangular subgrid $\Omega_s$, the directional smoothness function $(s, \nabla u)$ is defined as being equal to the difference between the value of the horizontal component u of the current estimate of the disparity vector field corresponding to the missing image at the nearest in the direction s neighbor of this grid point and the value of the horizontal component u of the current estimate of the disparity vector field corresponding to the missing image at this grid point.

At step 404, the desired system of nonlinear equations relative to the unknown current estimate of the disparity vector field corresponding to the missing image is formed by combining the optical flow function $g_t$ and its associated spatial partial derivatives $g_{tu}$, $g_{tv}$ for each filter and each image band specified by the index g∈G, together with the directional smoothness function $(s, \nabla u)$ for each image direction s∈S, and together with constant parameters using elementary algebraic operations such as addition, subtraction, multiplication and division, as follows.

$$\sum_{g \in G} \frac{\rho_g g_{tu} g_t}{r^2 + (p^2 + q^2 \|\nabla u\|^2)(g_t)^2} -$$

$$\sum_{s \in S} \frac{\rho_s(s, \nabla u)}{a^2 + (c^2 + b^2(s, \nabla' g_t)^2)(s, \nabla u)^2} + \gamma_u(u - u_0) = 0,$$

$$\sum_{(x,z) \in \Omega} \sum_{g \in G} \frac{\rho_g g_{tv} g_t}{r^2 + (p^2 + q^2 \|\nabla u\|^2)(g_t)^2} + \gamma_v(v - v_0) = 0,$$

Here: the expression $\|\nabla u\|$ represents a norm of the gradient $\nabla u$ of the horizontal component u of the disparity vector; the expression $b^2(s, \nabla')^2$ is defined by the relation $$b^2(s, \nabla' g_t)^2 = \sum_{g \in G} \rho_g b_g^2 (s, \nabla' g_t)^2,$$

where $\nabla' g_t = (g_{tu}, g_{tv})$; the expression $(u_o, v_o)$ represents an initial disparity vector; and $\rho_g, \rho_s, r, p, q, a, c, b_a$ are positive constant parameters.

Referring again to the processing flow diagram of FIG. 3, once the system of nonlinear equations from which initial estimates of the disparity vector fields are derived has been formed, these estimates are used as the current estimates of the disparity vector fields in step 305. Next, as shown at step 306, the system of nonlinear equations is linearized about the current estimates of the disparity vector fields (u,v) to form the following system of linear equations relative to the improvements of the current estimates of the disparity vector fields ($\Delta u, \Delta v$).

$$\sum_{g \in G} \frac{\rho_g r^2 g_{tu} (g_{tu} \Delta u + g_{tv} \Delta v)}{(r^2 + (p^2 + q^2 \|\nabla u\|^2)(g_t)^2)^2} -$$

$$\sum_{s \in S} \frac{\rho_s a^2 (s, \nabla(\Delta u))}{(a^2 + (c^2 + b^2(s, \nabla' g_t)^2)(s, \nabla u)^2)^2} + \gamma_u \Delta u =$$

$$\sum_{g \in G} \frac{-\rho_g g_{tu} g_t}{r^2 + (p^2 + q^2 \|\nabla u\|^2)(g_t)^2} +$$

$$\sum_{s \in S} \frac{\rho_s (s, \nabla u)}{a^2 + (c^2 + b^2(s, \nabla' g_t)^2)(s, \nabla u)^2} - \gamma_u (u - u_0),$$

$$\sum_{(x,z) \in \Omega} \sum_{g \in G} \frac{\rho_g r^2 g_{tv} (g_{tu} \Delta u + g_{tv} \Delta v)}{(r^2 + (p^2 + q^2 \|\nabla u\|^2)(g_t)^2)^2} + \gamma_v \Delta v =$$

$$\sum_{(x,z) \in \Omega} \sum_{g \in G} \frac{-\rho_g g_{tv} g_t}{r^2 + (p^2 + q^2 \|\nabla u\|^2)(g_t)^2} - \gamma_v (v - v_0).$$

In step 307, the system of linear equations obtained in step 305 is solved, and in step 308, the resulting solution is employed to improve upon or refine the current estimates of the disparity vector fields. More particularly, the improvements of the current estimates of the disparity vector fields ($\Xi u, \Xi v$) are added to the current estimates of the disparity vector fields (u,v) to obtain a new current estimate of the disparity vector field.

Once step 308 has further refined the current estimates of the disparity vector fields, the process transitions to query step 309, to determine whether the current estimates of the disparity vector fields are improved to the desired degree. By improved to the desired degree is meant that the norm of the lefthand side of the system of nonlinear equation of the current estimates of the disparity vector fields is less than the predefined positive constant.

If the answer to query step 309 is NO (further refinement of the current estimates of the disparity vector fields is required), the process loops to step 306, described above. If the answer to query step 309 is YES (no further refinement of the current estimates of the disparity vector fields is required), the process transitions to query step 310. In query step 310, a determination is made as to whether or not the current spatial resolution level is the finest level of spatial resolution desired for the resultant depth image. If not (the answer to query step 310 is YES), the routine transitions to step 311, which increments the current spatial resolution level of the multilevel resolution pyramid to the next finer level and substitutes the current estimate of the disparity vector field for the initial estimate of the current finer level of spatial resolution. From step 311, the process then loops to step 303.

Eventually, the answer to step 310 is YES, indicating that refined or optimum disparity vector fields have been obtained for all of the missing image points of the 'target' (finest spatial resolution) depth image. The process then transitions to step 312, which proceeds to estimate the missing images at the finest spatial resolution viewpoints.

Figure 6:
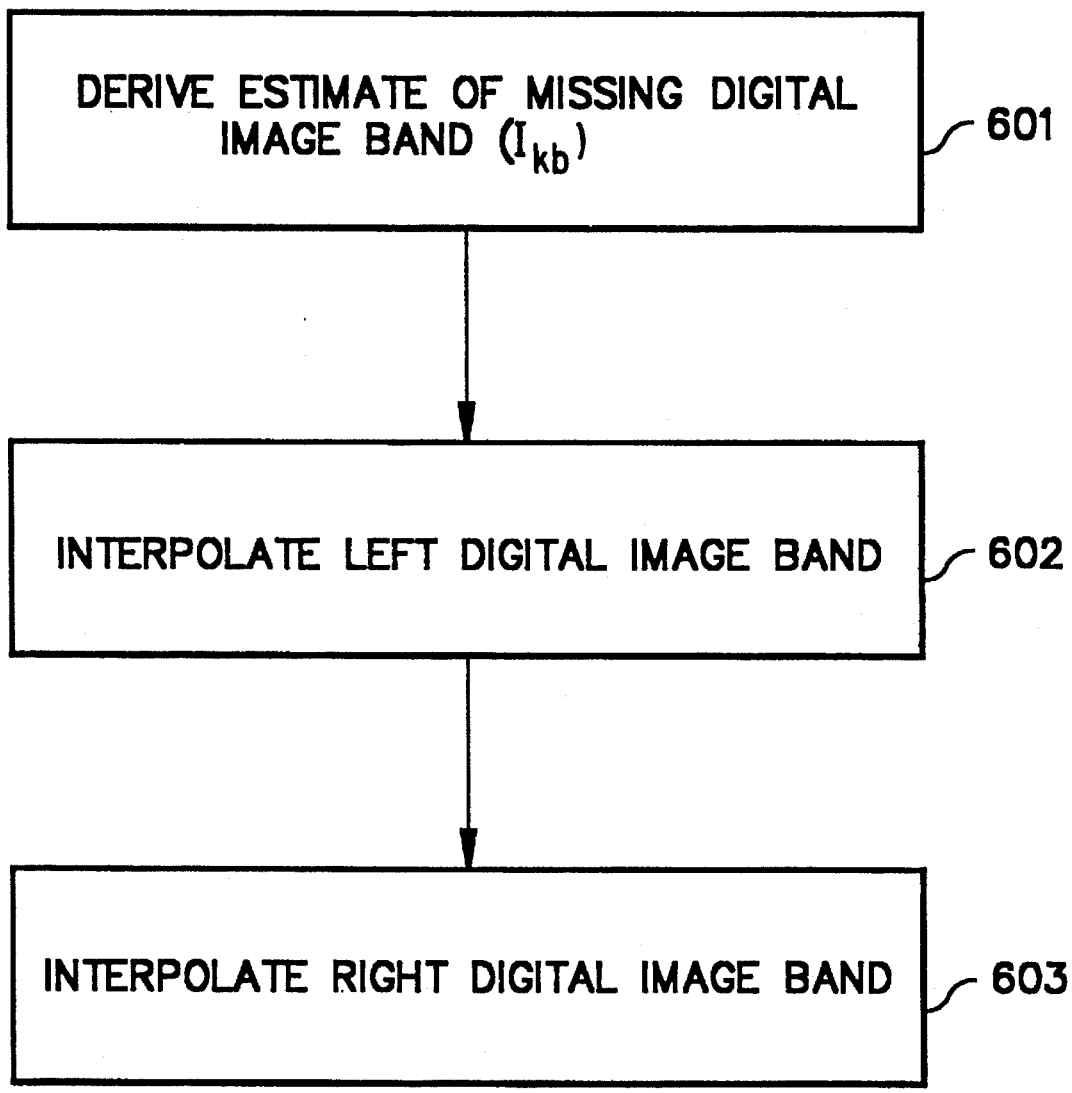
FIG. 6 is an image processing flow subroutine for deriving estimates of missing digital images taken at viewpoints $t_k$, $k=1, \ldots, L-1, L+1, \ldots, R-1, R+1, \ldots, K$ and consisting of bands $I_{k,1}, \ldots, I_{k,8}$, based on the obtained estimates of the disparity vector field $(U_k, V_k)$ corresponding to the missing image at a viewpoint $t_k$.

More particularly, in step 312, given: 1)—a sequence of final viewpoints $t_1 \ldots, t_L, \ldots, t_R, \ldots, t_K$; 2)—the left digital image of the stereo pair taken at the viewpoint $t_L$ (consisting of bands $I_{L,1}, \ldots, I_{L,B}$); and 3)—the right digital image of the stereo pair taken at the viewpoint $t_R$ (consisting of bands $I_{R,1}, \ldots, I_{R,B}$), estimates of missing digital images taken at the viewpoints $t_k$, k=1, ..., L−1, L+1, ..., R−1, R+1, ..., K and consisting of bands $I_{k,1}, \ldots, I_{k,B}$, based on the obtained estimates of the disparity vector field ($U_K, V_k$) corresponding to the missing image at the viewpoint $t_k$ are determined in accordance with the image processing flow subroutine of FIG. 6.

As shown at step 601, for each image band b=1, ..., B, an estimate of the missing digital image band ($I_{k,b}$) is derived as the sum of the estimated left digital image band, scaled by the factor ($|t_R−t_k|/(|t_R−t_k|+|t_L−t_k|)$) and the estimated right digital image band, scaled by the factor ($|t_L−t_k|/(|t_L−t_k|+|t_R−t_k|)$).

In step 602, using the grid of image points $\Omega_L$, described above, the left digital image band is then interpolated from the grid $\Omega''$, where the left digital image is defined relative to the grid $\Omega_L$. Likewise, in step 603, using the image of above-described grid of image points $\Omega_R$, the right digital image band is interpolated from the grid of points $\Omega''$, where the right digital image is defined to the grid of points $\Omega_R$.

Once 'missing' images have been generated, via interpolation or extrapolation, as described above, the depth image is obtained by interlacing the missing images, derived in accordance with the image processing routine of FIG. 3 for each of a plurality of missing image observation points $t_i$, with the stereo image pair, as shown at step 313 in FIG. 3. As noted earlier, this interlacing of missing images on the basis of the relative locations of the missing image viewpoints and the locations at which the stereo pair have been derived establishes the apparent movement in the three images caused by differences in the position of the camera lens. By considering the change in position of the camera lens as a vector (optical flow), missing images have been estimated as though the camera has actually positioned at each of the missing image viewpoints. (It should again be recalled that not all of the image points will have corresponding points of the stereo image pair, primarily due to occlusions.)

As will be appreciated from the foregoing description, the limitations of conventional depth image generation schemes discussed above are successfully overcome by the disparity vector field-based digital image processing methodology of the present invention, through which a depth image is generated using only a single pair of stereo images and reconstructing the images corresponding to the missing angular views (the missing images) from this stereo pair based upon an iteratively refined set of disparity vector fields that associate desired missing image locations with the pair of stereo images and makes it possible to realize a digital image that provides an optimally appealing perception of depth. Where the angular separation between the optically recorded pair of stereo images is small, these two stereo images are employed as the images corresponding to intermediate angular view locations, and images corresponding to missing angular views are reconstructed by either digitally interpolating or digitally extrapolating the stereo image pair, depending on whether or not the missing angular view is between the angular views of the stereo image pair or outside the angular views of the stereo image pair.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

| Parts List: | |
|---|---|
| 11 | Viewed scene |
| 13 | X-Z plane |
| 14 | Imaging camera |
| 15 | Image plane |
| 21 | Film strip |
| 22 | Scanner |
| 24 | Processing workstation |
| 301L | Step |
| 301R | Step |
| 302–313 | Steps |
| 401L | Step |
| 401R | Step |
| 402L | Step |
| 402R | Step |
| 403–404 | Steps |
| 601–603 | Steps |
| $DI_L$ | Left digital image |
| $DI_R$ | Right digital image |
| $D_1$ | Band |
| $D_B$ | Band |
| $I_{L,1}$ | Band |
| $I_{L,B}$ | Band |
| $I_{R,1}$ | Band |
| $I_{R,B}$ | Band |
| $t_L$ | Left stereo viewpoint |
| $t_R$ | Right stereo viewpoint |
| $t_i$ | Viewpoint |
| $t_1$ | Viewpoint |
| $t_{L-1}$ | Viewpoint |
| $t_{L+1}$ | Viewpoint |
| $t_{R-1}$ | Viewpoint |
| $t_{R+1}$ | Viewpoint |
| $t_K$ | Viewpoint |
| $U_K$ | Disparity vector field |
| $V_K$ | Disparity vector field |
| $U_1$ | Disparity vector field |
| $V_1$ | Disparity vector field |
| $U_{L-1}$ | Disparity vector field |
| $V_{L-1}$ | Disparity vector field |
| $U_{L+1}$ | Disparity vector field |
| $V_{L+1}$ | Disparity vector field |
| $U_{R-1}$ | Disparity vector field |
| $V_{R-1}$ | Disparity vector field |
| $U_{R+1}$ | Disparity vector field |
| $V_{R+1}$ | Disparity vector field |

What is claimed:

1. A method of generating a depth image of a scene comprising the steps of:

(a) providing first and second digital images of said scene derived at first and second scene observation locations spatially spaced apart from one another;

(b) for a plurality of spatially separated scene observation locations, spaced apart from one another and spaced apart from said first and second scene observation locations and associated with respective missing images of said depth image, generating missing angular digital images of said scene in accordance with an iteratively refined set of disparity vector fields that associate said plurality of spatially separated scene observation locations with said first and second digital images; and (c) interlacing said missing angular digital images of said scene and said first and second digital images to derive said depth image.

2. A method according to claim 1, wherein step (b) comprises deriving a respective missing angular digital image of said scene, associated with one of said plurality of spatially separated scene observation locations, by either digitally interpolating or digitally extrapolating said first and second digital images, in dependence upon with whether or not the observation location of said missing angular digital image is spatially between said first and second image observation locations or spatially outside said first and second image observation locations.

3. A method according to claim 1, wherein step (a) comprises capturing first and second images, from which said first and second digital images are provided, at respective left and right viewing locations $t_L$ and $t_R$, that are located in a common image observation plane and are spaced apart from one another along a first axis of a rectangular image viewing coordinate system, where a second axis thereof corresponds to depth into the image, and a third axis thereof is coplanar with said first axis.

4. A method according to claim 3, wherein respective ones $t_i$ of said plurality of spatially separated scene observation locations are located in said common image observation plane.

5. A method according to claim 4, wherein step (b) comprises generating a respective missing angular digital image associated with a respective one $t_i$ of said scene observation locations by deriving a prescribed correspondence between said respective missing angular digital image and said first and second digital images in accordance with a respective intermediate disparity vector field, said respective intermediate disparity vector field having a constant component along said third axis representative of alignment of said missing image with said first and second images, and a variable component along said first axis representative of depths of corresponding points in said scene.

6. A method according to claim 3, wherein said first and second digital images are digitized into first and second multi-banded digital images $DI_L$ and $DI_R$, respectively, having a fixed number of bands, and wherein the band of each of said first and second multi-banded digital images $DI_L$ and $DI_R$ is comprised of a two-dimensional array of pixels, arrayed in said common image observation plane and having associated pixel values which represent prescribed image parameters taken from a two-dimensional array of points $\Omega$ distributed throughout its associated captured image.

7. A method according to claim 6, wherein said first digital image comprises a plurality of first bands $I_{L,1}, \ldots, I_{L,B}$, and said second digital image comprises a plurality of second bands $I_{R,1}, \ldots, I_{R,B}$, and wherein step (b) comprises generating a plurality of disparity vector field estimates ($U_k$, $V_k$), where k=1, 2, ..., L−1, L+1, ..., R−1, R+1, ..., K, in accordance with partial derivatives of filtered image bands for each image band $I_{L,1}, \ldots, I_{L,B}, I_{R,1}, \ldots, I_{R,B}$ and a plurality of filters $\phi_1, \ldots, \phi_F$, through which each band of said first and second images are filtered.

8. A method according to claim 7, wherein step (b) comprises initially setting a coarsest spatial resolution level disparity vector field estimate of a respective missing image to a preselected constant, and thereafter iteratively modifying said coarsest spatial resolution level disparity vector field estimate of said respective missing image until final estimates of disparity vector fields are obtained.

9. A method according to claim 8, wherein step (b) comprises iteratively modifying a disparity vector field estimate of said respective missing image in accordance with a multi-level spatial resolution pyramid, wherein, at each increasingly finer resolution pyramid level, filtered images, their associated spatial partial derivatives and estimates of disparity vector fields corresponding to missing images are defined on subgrids of digital image observation points at increasingly finer degrees of spatial resolution.

10. A method according to claim 9, wherein, in step (b), at a given spatial resolution level, disparity vector fields associated with missing images are defined on a matrix of points $\Omega$ of an image plane comprised of N rows of pixels in a first direction corresponding to said first axis by M columns of pixels in a third direction corresponding to said third axis, and wherein said spatial partial derivatives are taken with respect to said third and first directions.

11. A method according to claim 10, wherein, in step (b), bands of filtered first images, spatial partial derivatives of said bands of filtered first images, bands of filtered second images, and spatial partial derivatives of bands of filtered second images are defined on a common matrix of points $\Omega'$ in an image plane having a size of N' rows by M' columns of pixels.

12. A method according to claim 9, wherein, in step (b), disparity vector fields corresponding to missing images at a respective spatial resolution level are defined by a system of non-linear equations expressed in terms of the respective direction partial derivative variables taken with respect to said third and first axes.

13. A method according to claim 12, wherein, in step (b), for a respective index g∈G specifying a prescribed filter and a particular image band, spatial partial derivatives of a prescribed optical flow function $g_t$ are formed with respect to components of a current estimate of the disparity vector along said third and first axes, corresponding to an index g as defined on a grid $\Omega$ sum, scaled by a prescribed factor, representative of the ratio of the difference between the observation point of a missing image of interest and said first and second scene observation locations spatially separation ratio factor, of spatial partial derivatives of estimated first and second filtered image bands.

14. A method according to claim 13, wherein said prescribed optical flow function $g_t$ is defined, relative to the matrix of viewpoint locations $\Omega$, as the difference between an estimated left filtered image band and an estimated right filtered image band, as viewed along said first axis.

15. A method according to claim 14, wherein, in step (b), bands of filtered first images, spatial partial derivatives of said bands of filtered first images, bands of filtered second images, and spatial partial derivatives of bands of filtered second images are defined on a common matrix of points $\Omega'$ in an image plane having a size of N' rows by M' columns of pixels.

16. A method according to claim 15, wherein said estimated left and right filtered image bands are defined relative to respective arrays of image points taken from said first and second scene observation locations, respectively, having associated perspective projections on said common image observation plane estimated from a respective missing image viewpoint, said right and left filtered images being interpolated from said common matrix of image points $\Omega'$.

17. A method according to claim 16, wherein said respective arrays of image points are defined by respective shifts of each image point of matrix of viewpoint locations $\Omega$, by an amount corresponding to scaling factors of the estimated disparity vector defined at that grid point.

18. A method according to claim 17, wherein step (b) comprises, for each vector s from a set S specifying a particular direction in said common image observation plane, forming a directional smoothness function (s,∇u), for a variable component u of the current estimate of the disparity vector field along said first axis, corresponding to the missing image, as a finite difference approximation to the directional derivative of said variable component u of the estimate of the disparity vector field corresponding to the missing image along said first axis, where s denotes a vector on the image plane specifying one of a plurality of different directions in said common image observation plane, and S denotes a set of vectors.

19. A method according to claim 18, wherein said directional smoothness function (s,∇u) is defined on a rectangular subgrid $\Omega_S$ of said matrix of viewpoint locations $\Omega$, and wherein each grid point of said rectangular subgrid $\Omega_S$ has a nearest neighbor on the rectangular grid $\Omega$.

20. A method according to claim 19, wherein, at each grid point of the rectangular subgrid $\Omega_s$, said directional smoothness function (s, ∇u) corresponds to the difference between the value of the component u of the current estimate of the disparity vector field corresponding to the missing image at the nearest neighbor, in the direction s, of said grid point and the value of the horizontal component u of the current estimate of the disparity vector field corresponding to the missing image at said grid point.

21. A method according to claim 18, wherein step (b) comprises forming a system of nonlinear equations relative to the unknown current estimate of the disparity vector field corresponding to the missing image by combining said optical flow function $g_t$ and associated spatial partial derivatives $g_{tu}, g_{tv}$, taken along said first and third axes, respectively, for each filter and each image band specified by said index g ∈G, together with said directional smoothness function (s,∇u) for each image direction.

22. A method according to claim 7, wherein step (b) comprises forming a system of nonlinear equations relative to the unknown current estimate of the disparity vector field corresponding to the missing image, linearizing said system of nonlinear equations from which initial estimates of the disparity vector fields are derived relative to the current estimates of the disparity vector fields, and employing solutions to the resulting set of linear equations to modify current estimates of said disparity vector fields.

23. A method according to claim 22, wherein step (b) further comprises modifying said estimates of disparity vector fields to a prescribed degree of spatial resolution and error and estimating missing images at a plurality of prescribed finest spatial resolution viewpoints, and wherein step (c) comprises interlacing said missing images at said plurality of prescribed finest spatial resolution viewpoints of said scene and said first and second digital images to derive said depth image.

24. A method of generating a depth image of a scene comprising the steps of:

(a) generating respective left and right images of said scene derived at stereo scene observation locations spaced apart from one another;

(b) for a plurality of spatially separated scene observation locations, spaced apart from one another and spaced apart from said stereo scene observation locations, and associated with respective missing images of said depth image, generating missing digital images of said scene in accordance with an iteratively refined set of disparity vector fields that associate said plurality of spatially separated scene observation locations with said left and right images; and (c) interlacing said missing images of said scene and said left and right images to derive said depth image.

25. A method according to claim 24, wherein step (b) comprises deriving a respective missing image of said scene, associated with one of said plurality of spatially separated scene observation locations, by the interpolation or extrapolation of said left and right images, in dependence upon with whether or not the observation location of said missing image is spatially between said left and right image observation locations or spatially outside said left and right image observation locations.

26. A method according to claim 24, wherein step (a) comprises capturing said left and right images at respective left and right viewing locations $t_L$ and $t_R$, that are located in a common image observation plane and are spaced apart from one another along a first, horizontal axis of a rectangular image viewing coordinate system, where a second, depth axis thereof corresponds to depth into the image, and a third, vertical axis thereof is coplanar with said first, horizontal axis.

27. A method according to claim 26, wherein respective ones $t_i$ of said plurality of spatially separated scene observation locations are located in said common image observation plane.

28. A method according to claim 27, wherein step (b) comprises generating a respective missing image associated with a respective one $t_i$ of said scene observation locations by deriving a prescribed correspondence between said respective missing image and said left and right images in accordance with a respective intermediate disparity vector field, said respective intermediate disparity vector field having a constant component along said vertical axis representative of alignment of said missing image with said left and right images, and a variable component along said horizontal axis representative of depths of corresponding points in said scene.

29. A method according to claim 28, wherein said left and right images are digitized into left and right multi-banded digital images $DI_L$ and $DI_R$, respectively, having a fixed number of bands, and wherein the band of each of said left and right multi-banded digital images $DI_L$ and $DI_R$ is comprised of a two-dimensional array of pixels, arrayed in said common image observation plane and having associated pixel values which represent prescribed image parameters taken from a two-dimensional array of points $\Omega$ distributed throughout its associated captured image.

30. A method according to claim 29, wherein said left multi-banded digital image comprises a plurality of left bands $I_{L,1}, \ldots, I_{L,B}$, and said right multi-banded digital image comprises a plurality of right bands $I_{R,1}, \ldots, I_{R,B}$, and wherein step (b) comprises generating a plurality of disparity vector field estimates $(U_k, V_k)$, where $k=1, 2, \ldots, L-1, L+1, \ldots, R-1, R+1, \ldots, K$, in accordance with partial derivatives of filtered image bands for each image band $I_{L,1}, \ldots, I_{L,B}, I_{R,1}, \ldots, I_{R,B}$ and a plurality of filters $\phi_1, \ldots,$ $\phi_F$, through which each band of said left and right multi-banded digital images are filtered.

31. A method according to claim 24, wherein step (b) comprises forming a system of nonlinear relationships with regard to an unknown current estimate of the disparity vector field corresponding to the missing image, linearizing said system of nonlinear relationships from which initial estimates of the disparity vector fields are derived relative to the current estimates of the disparity vector fields, and employing solutions to the resulting set of linear relationships to modify current estimates of said disparity vector fields.

32. A method according to claim 31, wherein step (b) further comprises modifying said estimates of disparity vector fields to a prescribed degree of spatial resolution and error and estimating missing images at a plurality of prescribed finest spatial resolution viewpoints, and wherein step (c) comprises interlacing said missing images at said plurality of prescribed finest spatial resolution viewpoints of said scene and said left and right digital images to derive said depth image.

33. A method according to claim 32 wherein step (b) comprises initially setting a coarsest spatial resolution level disparity vector field estimate of a respective missing image to a preselected constant, and thereafter iteratively modifying said coarsest spatial resolution level disparity vector field estimate of said respective missing image until final estimates of disparity vector fields are obtained.

34. A method according to claim 24 wherein step (b) comprises iteratively modifying a disparity vector field estimate of said respective missing images in accordance with a multi-level spatial resolution pyramid, wherein, at each increasingly finer resolution pyramid level, filtered images, their associated spatial partial derivatives and estimates of disparity vector fields corresponding to missing images are defined on subgrids of digital image observation points at increasingly finer degrees of spatial resolution.

35. A method according to claim 34, wherein, in step (b), at a given spatial resolution level, disparity vector fields associated with missing images are defined on a matrix of points of an image plane comprised of plural rows of pixels arranged in a horizontal direction along a horizontal axis, and by multiple columns of pixels arranged in a vertical direction along a vertical axis, and wherein said partial spatial derivatives are taken with respect to said vertical and horizontal directions.

36. A method according to claim 35, wherein, in step (b), disparity vector fields corresponding to missing images at a respective spatial resolution level are defined by a system of non-linear equations expressed in terms of the respective direction partial derivative variables taken with respect to said vertical and horizontal axes.

37. A method according to claim 36, wherein, in step (b), for a respective index specifying a prescribed filter and a particular image band, spatial partial derivatives of a prescribed optical flow function are formed with respect to components of a current estimate of the disparity vector along said vertical and horizontal directions, corresponding to an index defined on a grid sum, scaled by a prescribed factor, representative of the ratio of the difference between the observation point of a missing image of interest and said left and right scene observation locations spatially separation ratio factor, of spatial partial derivatives of estimated left and right filtered image bands.

38. A method according to claim 37, wherein said prescribed optical flow function is defined, relative to said matrix of points of said image plane, in accordance with the difference between an estimated left filtered image band and an estimated right filtered image band, as viewed along said horizontal axis.

39. A system for generating a depth image of a scene comprising:

an image capture apparatus which is operative to capture respective left and right images of said scene at stereo scene observation locations that are spaced apart from one another in a common image plane and to output respective left and right digital images, each of said left and right digital images being comprised of a matrix of multiband pixels encoded to a prescribed digital code width; and a digital image processor, which is coupled to receive said left and right digital images and generates, for a plurality of spatially separated scene observation locations, spaced apart from one another and spaced apart from said stereo scene observation locations, and associated with respective missing images of said depth image, missing digital images of said scene, by processing said left and right digital images in accordance with an iteratively refined set of disparity vector fields that associate said plurality of spatially separated scene observation locations with said left and right images, and interlaces said missing images of said scene and said left and right images to produce said depth image.

40. A system according to claim 39, wherein said digital image processor is operative to generate a respective missing image of said scene, associated with one of said plurality of spatially separated scene observation locations, by interpolating or extrapolating said left and right images, in dependence upon with whether or not the observation location of said missing image is spatially between said left and right image observation locations or spatially outside said left and right image observation locations.

41. A system according to claim 39, wherein said image capture apparatus is operative to capture said left and right images at respective left and right viewing locations $t_L$ and $t_R$, that are located in a common image observation plane and are spaced apart from one another along a first, horizontal axis of a rectangular image viewing coordinate system, where a second, depth axis thereof corresponds to depth into the image, and a third, vertical axis thereof is coplanar with said first, horizontal axis.

42. A system according to claim 41, wherein respective ones $t_i$ of said plurality of spatially separated scene observation locations are located in said common image observation plane.

43. A system according to claim 42, wherein said digital image processor is operative to generate a respective missing image associated with a respective one $t_i$ of said scene observation locations by deriving a prescribed correspondence between said respective missing image and said left and right images in accordance with a respective intermediate disparity vector field, said respective intermediate disparity vector field having a constant component along said vertical axis representative of alignment of said missing image with said left and right images, and a variable component along said horizontal axis representative of depths of corresponding points in said scene.

44. A system according to claim 43, wherein said left and right images are digitized into left and right multi-banded digital images $DI_L$ and $DI_R$, respectively, having a fixed number of bands, and wherein the band of each of said left and right multi-banded digital images $DI_L$ and $DI_R$ is comprised of a two-dimensional array of pixels, arrayed in said common image observation plane and having associated pixel values which represent prescribed image parameters taken from a two-dimensional array of points $\Omega$ distributed throughout its associated captured image.

45. A system according to claim 44, wherein said left digital image comprises a plurality of left bands $I_{L,1}, \ldots, I_{L,B}$, and said right digital image comprises a plurality of right bands $I_{R,1}, \ldots, I_{R,B}$, and wherein step (b) comprises generating a plurality of disparity vector field estimates $(U_k, V_k)$, where k=1, 2, ..., L1, L+1, ..., R-1, R+1, ..., K, in accordance with partial derivatives of filtered image bands for each image band $I_{L,1}, \ldots, I_{L,B}, I_{R,1}, \ldots, I_{R,B}$ and a plurality of filters $\phi_1, \ldots, \phi_F$, through which each band of said left and right digital images are filtered.

46. A system according to claim 39, wherein said digital image processor is operative to generate a system of non-linear equations relative to an unknown current estimate of the disparity vector field corresponding to the missing image, to linearize said system of nonlinear equations from which initial estimates of the disparity vector fields are derived relative to the current estimates of the disparity vector fields, and to modify current estimates of said disparity vector fields in accordance with solutions to the resulting set of linear equations.

47. A system according to claim 46, wherein said digital image processor is operative to modify said estimates of disparity vector fields to a prescribed degree of spatial resolution and error and estimating missing images at a plurality of prescribed finest spatial resolution viewpoints, and to interlace said missing images at said plurality of prescribed finest spatial resolution viewpoints of said scene with said left and right digital images to derive said depth image.

48. A system according to claim 47, wherein said digital image processor is operative to initially set a coarsest spatial resolution level disparity vector field estimate of a respective missing image to a preselected constant, and thereafter iteratively modify said coarsest spatial resolution level disparity vector field estimate of said respective missing image until final estimates of disparity vector fields are obtained.

49. A system according to claim 39, wherein said digital image processor is operative to iteratively modify a disparity vector field estimate of said respective missing images in accordance with a multi-level spatial resolution pyramid, and wherein, at each increasingly finer resolution pyramid level, filtered images, their associated spatial partial derivatives and estimates of disparity vector fields corresponding to missing images are defined on subgrids of digital image observation points at increasingly finer degrees of spatial resolution.

50. A system according to claim 49, wherein said digital image processor is operative, for a given spatial resolution level, to define disparity vector fields associated with missing images on a matrix of points of an image plane comprised of plural rows of pixels arranged in a horizontal direction along a horizontal axis, and by multiple columns of pixels arranged in a vertical direction along a vertical axis, and wherein said partial spatial derivatives are taken with respect to said vertical and horizontal directions.

51. A system according to claim 50, wherein said digital image processor is operative to define disparity vector fields corresponding to missing images at a respective spatial resolution level by a system of non-linear equations expressed in terms of the respective direction partial derivative variables taken with respect to said vertical and horizontal axes.

52. A system according to claim 51, wherein said digital image processor is operative, for a respective index specifying a prescribed filter and a particular image band, to form spatial partial derivatives of a prescribed optical flow function with respect to components of a current estimate of the disparity vector along said vertical and horizontal directions, corresponding to an index defined on a grid sum, scaled by a prescribed factor, representative of the ratio of the difference between the observation point of a missing image of interest and said left and right scene observation locations spatially separation ratio factor, of spatial partial derivatives of estimated left and right filtered image bands.

53. A system according to claim 52, wherein said prescribed optical flow function is defined in accordance with the difference between an estimated left filtered image band and an estimated right filtered image band, as viewed along said horizontal axis.

54. The system as set forth in claim 39 wherein said digital image processor further includes electronic means for receiving said left and right digital images and providing, in response thereto, a set of multiband pixel electrical signals representative of said multiband pixels, said missing digital images being in the form of missing digital image electrical signals, said processor being responsive to said multiband pixel electrical signals and said missing digital image electrical signals for providing output signals representative of said depth image.

* * * * *